United States Patent
Balachandran et al.

(10) Patent No.: US 7,403,790 B2
(45) Date of Patent: Jul. 22, 2008

(54) METHODS FOR SIGNALING BROADCAST AND MULTICAST INFORMATION IN COMMUNICATION NETWORKS

(75) Inventors: Krishna Balachandran, Morganville, NJ (US); Kenneth C. Budka, Marlboro, NJ (US); Arnab Das, Washington, DC (US); Joseph H. Kang, Belle Mead, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 803 days.

(21) Appl. No.: 10/654,426

(22) Filed: Sep. 4, 2003

(65) Prior Publication Data

US 2005/0054331 A1    Mar. 10, 2005

(51) Int. Cl.
*H04M 11/04* (2006.01)
*H04M 1/00* (2006.01)
*H04Q 7/20* (2006.01)
*H04B 15/00* (2006.01)
*H04B 1/38* (2006.01)

(52) U.S. Cl. ............... 455/518; 455/404.2; 455/458; 455/503

(58) Field of Classification Search ............ 455/458, 455/404.2, 503, 518
See application file for complete search history.

(56) References Cited

U.S. PATENT DOCUMENTS

| | | | | |
|---|---|---|---|---|
| 6,032,051 | A | * | 2/2000 | Hall et al. ............... 455/518 |
| 7,149,499 | B1 | * | 12/2006 | Oran et al. ............ 455/404.2 |
| 2003/0114177 | A1 | | 6/2003 | Sinnarajah et al. |
| 2005/0282571 | A1 | * | 12/2005 | Oprescu-Surcobe et al. 455/503 |
| 2006/0148493 | A1 | * | 7/2006 | Narasimha et al. ......... 455/458 |
| 2007/0178917 | A1 | * | 8/2007 | Balachandran et al. ...... 455/458 |

FOREIGN PATENT DOCUMENTS

| | | |
|---|---|---|
| EP | 1 213 939 | 6/2002 |
| WO | WO 00/54442 | 9/2000 |
| WO | WO 2004/017581 | 2/2004 |

OTHER PUBLICATIONS

European Search Report dated May 4, 2005.
"MBMS Notification Mechanism." 3GPP TSG RAN WG2 MBMS ADHOC, May 15-16, 2003, pp. 1-2.
"Physical Layer Standard for cdma2000 Spread Spectrum Systems." 3GPP2 C.20002-C, Version 1.0, May 28, 2002, pp. 3-143 to 3-144.
"MBMS Notification Solution using PICH." 3GPP TSG RAN WG2 on MBMS, May 15-16, 2003, pp. 1-5.
"MBMS impacts on PICH usage." 3GPP TSG RAN 2G2 37, TDOC R2-031816, Aug. 25-29, 2003, pp. 1-4.
"BPMS Transmission Methods." 3GPP2 TSG-C SWG2.3, C23-BCMCAHG-20030904-002R3, Sep. 11, 2003, pp. 4-10.
"Release D BCMCS Functional Requirements." 3GPP2, TSG-C, Working Group 2, Aug. 18, 2003, pp. 1-21.
1xBCMCS, Overview of cdma2000 L2/L3 Design, Regulan Sinnarajah, May 12, 2003.

* cited by examiner

*Primary Examiner*—William D Cumming (57) ABSTRACT

Methods for signaling information to a group of users in a communication network supporting a broadcast-multicast service are described, in which one or more indicator bits of a sequence may be assigned to indicate transmission of signaling information that is related to the group. The sequence may be transmitted to the group on a first channel, with the signaling information related to the group being transmitted on a second channel.

7 Claims, 5 Drawing Sheets

(S1) Assigning indicator bits of a sequence of indicator bits which are distributed at bit positions in each quarter slot of an entire slot of a quick paging channel to indicate transmission of signaling information related to broadcast-multicast service related to a group (S2) Transmitting the sequence to the group and the signaling information related to the group

METHODS FOR SIGNALING BROADCAST AND MULTICAST INFORMATION IN COMMUNICATION NETWORKS

BACKGROUND OF THE INVENTION

1. Field of the Invention

The present invention relates to signaling information in communication systems or networks supporting Broadcast-Multicast services (BCMCS).

2. Related Art

Current second generation and third generation wireless systems are primarily designed to support unicast voice and data services. The support of these unicast services to the end user has been achieved through various advances in wireless and networking technologies. The current emphasis in international standardization bodies such as 3GPP and 3GPP2 is on the design of protocols and procedures that allow the support of Broadcast-Multicast Services (BCMCS) over evolving networks. BCMCS is a bandwidth-conserving technology that reduces traffic by simultaneously delivering a single stream of information to a large number of recipients. Examples of these services include voice dispatch or Press-To-Talk (PTT) type services, broadcast/multicast streaming, etc.

There has been recent industry interest in the Public Safety Wireless Network (PSWN) context, where support of BCMCS may be especially important in terms of radio resource management. Radio resource management procedures may be needed to achieve low delay in establishment and delivery of BCMCS content, to provide scalability in terms of the number of multicast groups and/or number of users per multicast group, and to provide advanced service capabilities (e.g., ability to monitor/extract content from multiple BCMCS streams). Further, radio resource management procedures may be needed to achieve high spectral efficiency, to provide security (authentication, encryption and identity protection), and to improve mobile station battery life. Thus, radio resource management procedures that improve spectral efficiency, battery life and/or provide service flexibility are of interest to network operators.

Thus, new technical challenges are emerging in the design of radio resource management procedures to improve spectral efficiency and service flexibility in third generation wireless communication systems providing mixed voice and data services. In meeting mixed voice and data service demands, system overhead information should be carried for signaling BCMCS streams, or flows. This system information may be embodied as a radio channel configuration, logical to physical channel mappings, neighbor list information, etc, for example.

A message referred to as a Broadcast Service Parameters Message (BSPM) carries this BCMCS-related signaling information. The size of the BSPM depends on factors such as the number of Broadcast-Multicast (BCMC) sessions for which logical-to-physical mappings (LPMs) have been established in the sector. An LPM specifies which BCMCS content is carried by what physical channel (such as a Forward Broadcast Supplemental Channel (F-BSCH) in cdma2000, for example) in the forward link. The BSPM may possibly be several hundreds of bytes long. The timely delivery of BSPM may require data rates on the order of several kbps.

A necessity exists to design and define efficient methods for carrying the BSPM that enable delivery of 'time-critical' BSPMs with low delays, so as to provide quick notification of availability of BCMC content for a BSPM flow and/or quick initiation of content delivery for a certain BCMC flow. In addition, the BSPM should use spectrally efficient channels for transmission and should not significantly impact battery life of BCMC-capable mobile stations. Further, the BSPM (and transmission thereof) should minimize impact on battery life of mobile stations that do not have BCMC capabilities.

Current techniques for transmission of the BSPM in third generation wireless communications networks such as cdma2000 3G.1x include use of a paging channel (PCH) and/or a Forward Common Control Channel/Forward Broadcast Control Channel (F-CCCH/F-BCCH). In third generation wireless communications networks such as cdma2000 3G.1x spread spectrum systems, a PCH is a code channel in a Forward CDMA Channel that is used for transmission of control information and pages from a base station to a mobile station. A paging channel slot may be defined as an 80 ms interval on the PCH. Mobile stations operating in the slotted mode are assigned specific slots in which they monitor messages from the base station. Mobile stations in an idle state and operating in slotted mode only monitor selected slots on the PCH and F-CCCH, thereby improving battery life.

A feature known as 'Quick Paging' permits mobile stations to further conserve battery power beyond the savings achieved by slotted mode operation. A Quick Paging Channel (QPCH) is an un-coded, on-off-keyed (OOK) spread spectrum signal sent by base stations to inform slotted mode mobile stations, operating in the idle state, whether to monitor the PCH or the Forward Common Control Channel (F-CCCH). Like the PCH, the QPCH has an 80 ms duration. A paging indicator is a one-bit datum sent on the QPCH. Quick paging indicators are associated with mobile stations, in pairs, via a hashing algorithm. Appearance of both of its paging indicators in its assigned QPCH slot serves to alert a slotted mode mobile station, operating in the idle state, that the mobile should monitor the PCH or the F-CCCH starting in the next slot.

In general, the PCH technique involves paging to indicate BSPM changes, and paging to indicate what BSPMs are transmitted on the PCH. For BSPM transmission on the PCH, data rates are relatively low (up to only about 9.6 kbps). In addition, there exists low spectral efficiency, which is inefficient for transmitting long BSPMs in a timely manner.

Currently, PCH protocol provides two methods for the transmission of broadcast messages, (a) Multi-slot Broadcast Message Transmission; and (b) Periodic Broadcast Paging. Each method enables mobile stations operating in the slotted mode or in the non-slotted mode [define as compared to slotted mode] to receive broadcast messages. According to (a), a broadcast message is sent in a sufficient number of assigned slots such that it may be received by all mobile stations that are operating in the slotted mode. Thus, a BSPM transmission appears on all assigned slots in a slot cycle, which may result in an inefficient use of forward link resources.

According to (b), mobile stations configured to receive broadcast messages monitor a specific broadcast slot, such as the first slot of a broadcast paging cycle. If all of the broadcast messages to be transmitted fit within the first slot of a broadcast paging cycle, they may all be transmitted in this broadcast slot. If there is a single broadcast message to be transmitted, the single broadcast message may be transmitted at the beginning of this broadcast slot.

Alternately, one or more broadcast pages may be transmitted in the first slot of a broadcast paging cycle. Each broadcast page is associated with a subsequent broadcast slot. For each broadcast page, an associated broadcast message may be transmitted in the associated subsequent broadcast slot. A problem with (b) is that a non-BCMC capable mobile station that supports the QPCH will "wake up" to decode BSPM.

This method thus may waste battery life of these non-BCMC capable mobile stations.

For transmitting a BSPM on a F-CCCH, paging on the F-CCCH is used to inform slotted mode mobiles of the BSPM transmission, and the F-BCCH is used to carry the BSPM. One method available for paging on the F-CCCH is use of a multi-slot enhanced broadcast page. However, this method has the same problem as the Multi-slot Broadcast Message Transmission for PCH. Namely, a BSPM transmission appears on all assigned slots in a slot cycle, which may result in inefficient use of forward link resources.

Another method for BSPM transmission on the F-CCCH includes use of a periodic enhanced broadcast page. However, this method has a problem similar to the Periodic Broadcast Paging described with respect to the PCH. In other words, the same battery life problem for mobile stations that do not support BCMCS exists. Additionally, there exists a minimum broadcast paging cycle of 5.12 seconds, which may adversely affect a delay requirement for delivery of "time-critical" BSPMs. Further, frequent changes in BSPM information technology may also require legacy mobile stations to monitor the F-BCCH, even though there have been no changes in other system information (unrelated to BCMCS).

SUMMARY OF THE INVENTION

Exemplary embodiments are directed to methods for signaling information to a group of users in a communication network supporting a broadcast-multicast service. One or more indicator bits of a sequence of indicator bits may be assigned to indicate transmission of signaling information that is related to the group. The sequence may then be transmitted to the group on a first channel, with the signaling information related to the group being transmitted on a second channel.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention and wherein.

DETAILED DESCRIPTION OF THE EXEMPLARY EMBODIMENTS

Although the following description is described as based on a generic wireless communication network or system supporting Broadcast-Multicast services (BCMCS), and will be described in this exemplary context, it should be noted that the exemplary embodiments shown and described herein are meant to be illustrative only and not limiting in any way. As such, various modifications will be apparent to those skilled in the art for application to wireless communication systems or networks based on 3G-1x EV-DO, 3G-1x EV-DV and UMTS technologies that may currently support or be adapted to support BCMCS, for example, and are contemplated by the teachings herein.

Additionally where used below, the term 'user' may be considered synonymous to user equipment, subscriber, BCMCS subscriber, mobile station, remote station, access terminal, etc., and describes a remote user of wireless resources in a wireless communication network. A user may also be occasionally referred to as a receiver of a multicast message. Groups of users of BCMCS may be occasionally referred to as a 'BCMC group' or 'multicast group' for purposes of brevity.

The terms base station and Node-B may be considered synonymous, and describe equipment that provides data connectivity between a network and one or more mobile stations. A system or network (such as an access network) may include one or more base stations.

Point-to-multipoint services such as BCMCS allow data from a single source entity to be transmitted to multiple endpoints. BCMCS is intended to efficiently use radio/network resources in transmitting data over a radio channel. Data may be transmitted to multicast areas as defined by the network. A network may selectively transmit BCMCS content on sectors within the multicast area which contain members of a multicast group.

A BCMCS received by a user may involve one or more successive multicast sessions. For example, a BCMCS might consist of a single on-going session (e.g. a multimedia stream) or may involve several intermittent BCMCS sessions over an extended period of time (e.g. messages). Applications that may take advantage of BCMCS, and hence, of the exemplary embodiments of the present invention, may include, but are not limited to, voice dispatch or Press-To-Talk (PTT) type services, broadcast/multicast streaming, videoconferencing, corporate communications, distance learning, online bidding, online gaming and distribution of software, stock quotes, and news, etc.

In general, the exemplary embodiments of the present invention are directed to signaling information to a group of users, and the reception of signaling information by a group of users, in a wireless communications network or system supporting broadcast-multicast services (BCMCS). For the following discussion, groups of users may be considered a 'BCMC group', a 'multicast group' or simply referred to as a 'group' for reasons of brevity.

An exemplary embodiment is directed to a signaling method for a group of users in a communication network supporting a broadcast-multicast service, in which a system overhead message, known as a 'Broadcast Service Parameters Message' (BSPM) is transmitted to each BCMC group. The BSPM, which is carried in a paging channel or control channel, may be signaled to one or more users in the group by assigning one of more indicator bits arranged in one or more specified slots of a quick paging channel, for example. Alternatively, the quick paging channel may include indicators in given bit positions within a slot of the channel. The indicator may be mapped to signaling information to enable as a unique flow identification (BCMCS flow ID) for a given broadcast-multicast service content flow subscribed to by one or more users in the group.

Another exemplary embodiment is directed to a method of signaling information to a group of users, in which a paging channel or common control channel may be transmitted to the group. The paging channel or common control channel (PCH/F-CCCH) may include a paging slot containing signaling information for a broadcast-multicast service subscribed to by one or more users of the group. The paging slot may be referred to as a broadcast-multicast (BCMC) slot, for example.

Another exemplary embodiment is directed to a method of signaling information to a group of users that combines the assigning of BSPM indicators in the QPCH with the use of the BCMC paging slot in the PCH/F-CCCH to carry the BCMCS-related signaling information. The QPCH is initially transmitted, and the PCH/F-CCCH with paging slot transmitted thereafter. The paging slot contains signaling information (such as the BSPM) for a broadcast-multicast service subscribed to by one or more of the users of the group.

Another exemplary embodiment is directed to a method of signaling information to the group, in which signaling information is transmitted together with broadcast-multicast service content on a physical channel to one or more users of the group. In other words, a single physical channel, such as a F-BSCH, may be used to transmit the BSPM and the BCMCS content.

Another exemplary embodiment is directed to a method of signaling information to the group, in which one part of the signaling information may be transmitted on a first channel, and another part of signaling information may be transmitted on a second channel, together with broadcast-multicast service content, to one or more users of the group. The first channel may be a QPCH and the second channel may be a F-BSCH, for example.

Figure 4:
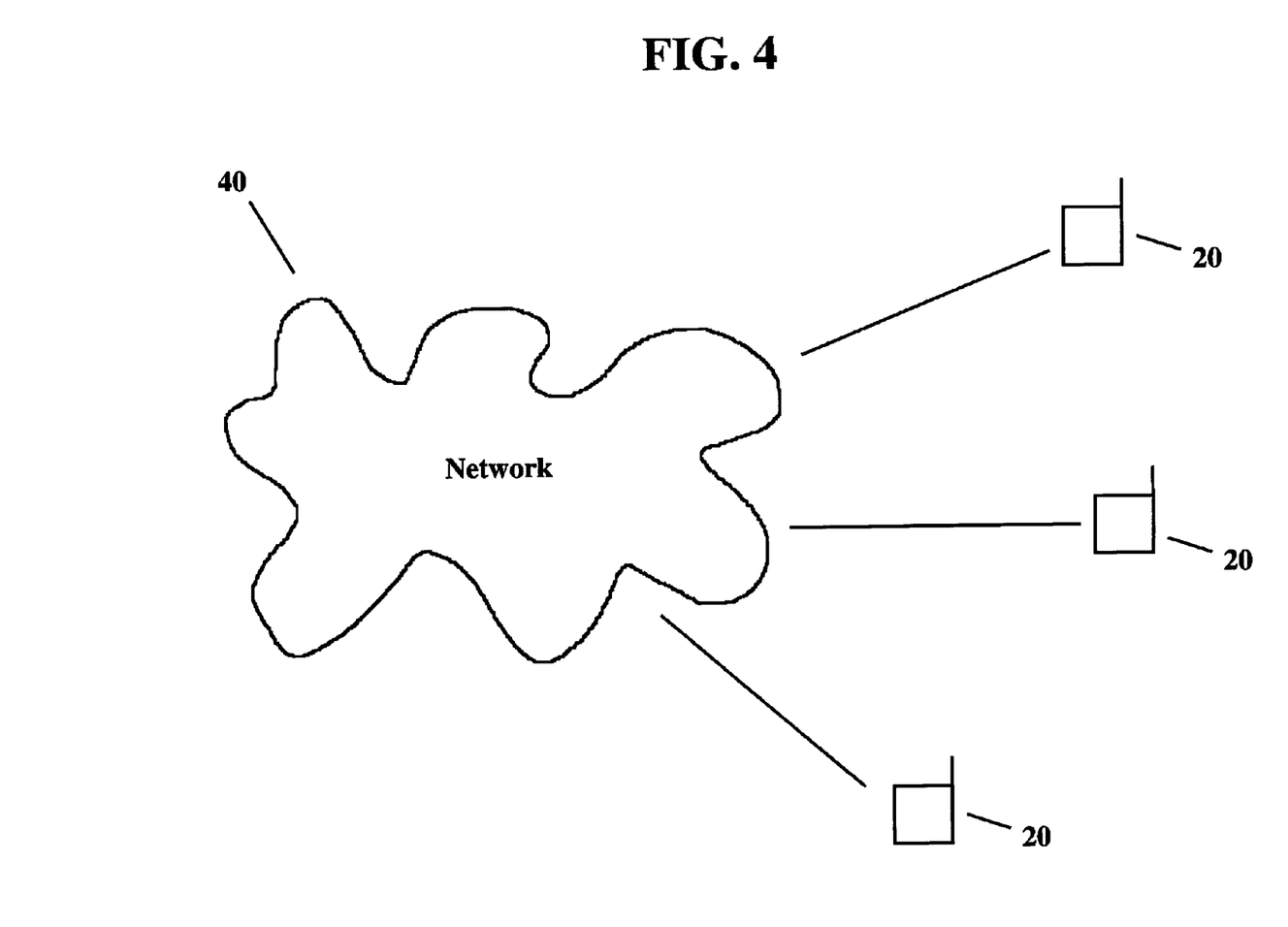
FIG. 4 is a diagram illustrating a network and a group of users.

FIG. 4 is a diagram illustrating a network 40 and a group of users 20.

Figure 1:
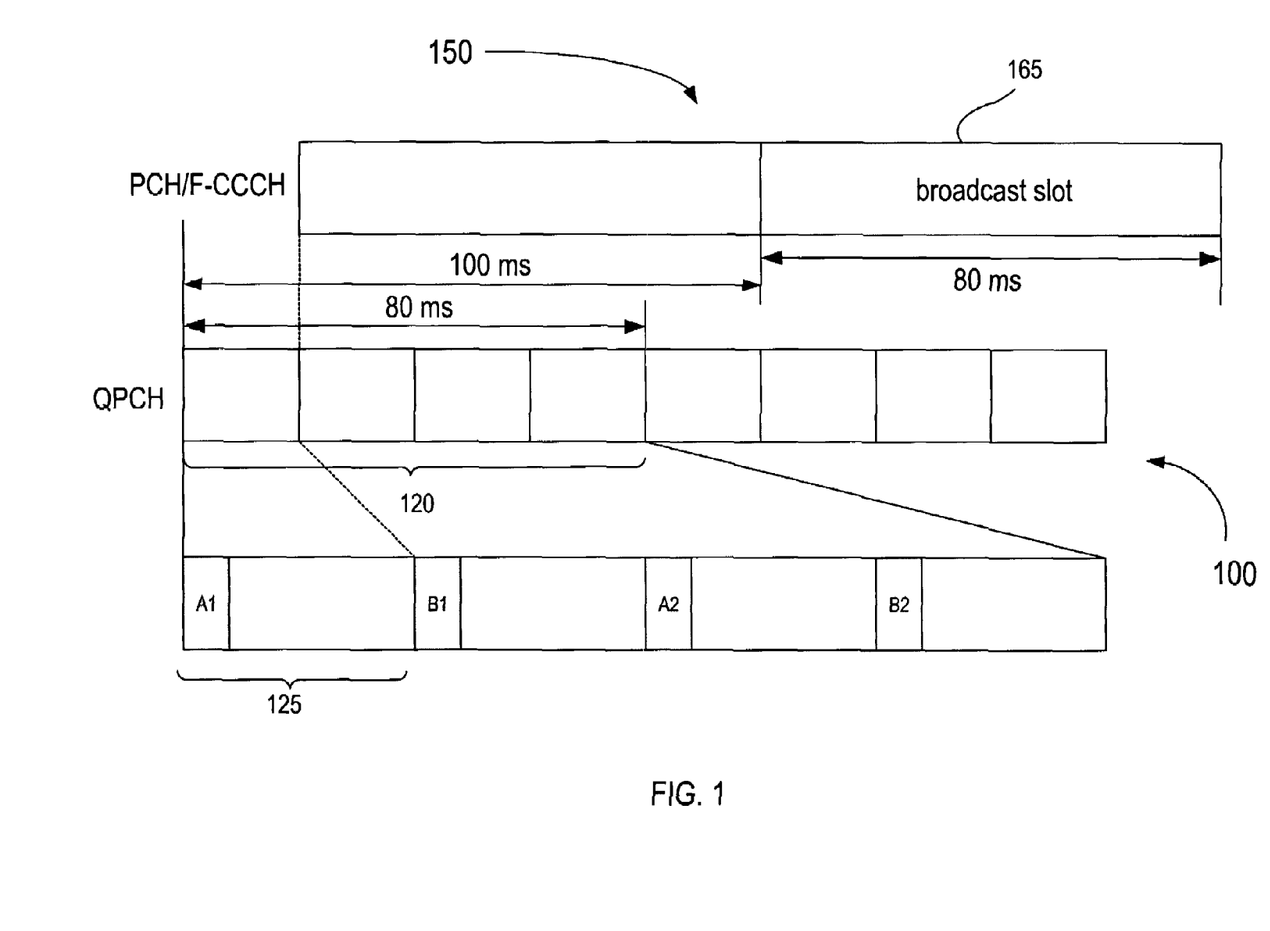
FIG. 1 is a diagram illustrating a slot structure of a quick paging channel in accordance with an exemplary embodiment of the invention.

FIG. 1 is a diagram illustrating a slot structure of a quick paging channel in accordance with an exemplary embodiment of the invention. Referring to FIG. 1, a slot structure of a quick paging channel (QPCH) 100 is illustrated, and the QPCH 100's relationship to a PCH/F-CCCH 150 carrying signaling information such as a BSPM in a broadcast slot 165.

The BSPM may be transmitted continuously by each sector as an overhead message on the forward PCH or carried on the F-BCCH. A user (mobile station) should decode (read) the BSPM to obtain the relevant signaling information needed to receive BCMCS content over the traffic channel (F-BSCH). For example, the BSPM may include data for each F-BSCH that carries BCMCS content. This data may include the radio channel configuration, data rate, frame size, channelization code data, multiplexing options and channel frequency of the F-BSCH. Additionally, for each BCMCS content, the BSPM may include data such as a BCMCS content identifier (e.g., BCMCS flow ID), BCMCS transmission indicator, and one or more logical-to-physical channel mappings (LPMs). For each LPM, neighbor BCMCS configuration and neighbor BCMCS parameters may be included. This may also be referred to as a 'neighbor list' for brevity.

Referring again to FIG. 1, the QPCH 100 may include a plurality of QPCH slots 120, each slot duration being approximately 80 ms, although this slot size is not limited to 80 ms, other durations may be acceptable. An individual QPCH slot 120 may include quarter-slots 125. Each quarter slot 125 may carry an indicator bit; as shown in FIG. 1, these indicator bits are represented by pairs (A1, A2) and (B1, B2). These indicator bits may be referred to as 'BSPM Indicators'. In this case, these BSPM indicators are not specific to a particular BCMC group, but rather are indicators used by all BCMC groups. A wireless communication network may assign, on each QPCH 100, two indicator bit positions for all BCMCS flows on a QPCH slot 120. In other words, if a BCMCS flow 'A' represents "HBO" (network programming), for example, the two indicator bit positions for the 'A' BCMCS flow are A1 and A2.

In FIG. 1, BSPM indicators (A1, A2) and (B1, B2) are carried on a QPCH slot 120 so as to precede a corresponding broadcast slot 165 of the PCH/F-CCCH 150. As shown in FIG. 1, the QPCH slot 120 is offset by about 100 ms from the broadcast slot 165 on the PCH/F-CCCH 150. In FIG. 1 the BSPM indicators are shown in the first bit positions in each quarter slot 125. The BSPM indicators may be set in existing indicator bit positions in the QPCH 100, in place of current reserve bit positions in the QPCH 100, or in bit positions to be newly defined for the QPCH 100.

Figure 5:
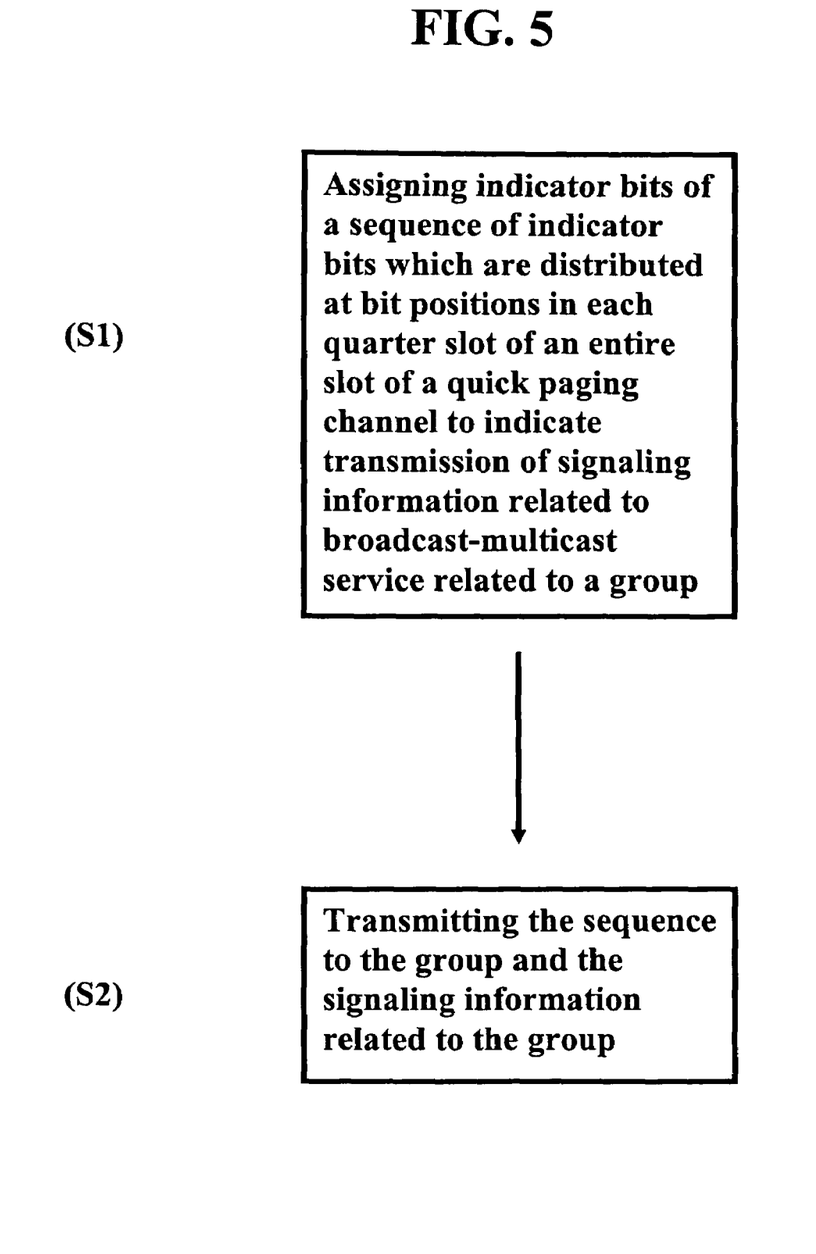
FIG. 5 is a diagram illustrating a method of signaling information to a group of users.

For example, referring to FIG. 5, In order to transmit signaling information to a group of users, such as a BCMC group, the network assigns the BSPM indicator(s) to the QPCH channel 100 (S1), such as the given bit positions in quarter-slots 125 shown in FIG. 1, then transmits the QPCH 100 to the group (S2).

On the user side, and to receive BCMCS-related signaling information, the user should be BCMC-capable, operating in the slotted mode and supporting QPCH. The user should decode the QPCH slot 120, and hence read the indicators in the quarter-slots 125, to determine whether or not the user will monitor a subsequent broadcast slot 165 for a BSPM. If both BSPM indicators (A1, A2) and/or (B1, B2) are enabled (e.g., the user detects that both the BSPM indicators are 'ON"), then the user monitors the broadcast slot 165 immediately following the QPCH slot 120 for a BSPM. Otherwise, the user (mobile) does not monitor the broadcast slot 165 following the QPCH slot 120 for a BSPM, since at least one of the BSPM indicators is 'OFF' (not enabled).

The signaling methods described with respect to FIG. 1 may significantly improve battery life of mobile stations that do not support BCMCS, but support QPCH, while other users are not impacted at all. The structure in FIG. 1 also demonstrates efficient transmission of BSPM on the forward link, with no unnecessary repetition of BSPMs in a slot cycle.

BCMC-capable users that support QPCH have to monitor two additional bits in only one slot 120 of the QPCH 100 in a broadcast paging cycle. This is an insignificant impact on mobile station complexity, and has no adverse impact on BCMC-capable users that do not support QPCH. The user decodes the BSPM irrespective of whether the BSPM contains any information on a BCMC flow the user is interested in monitoring.

Figure 2:
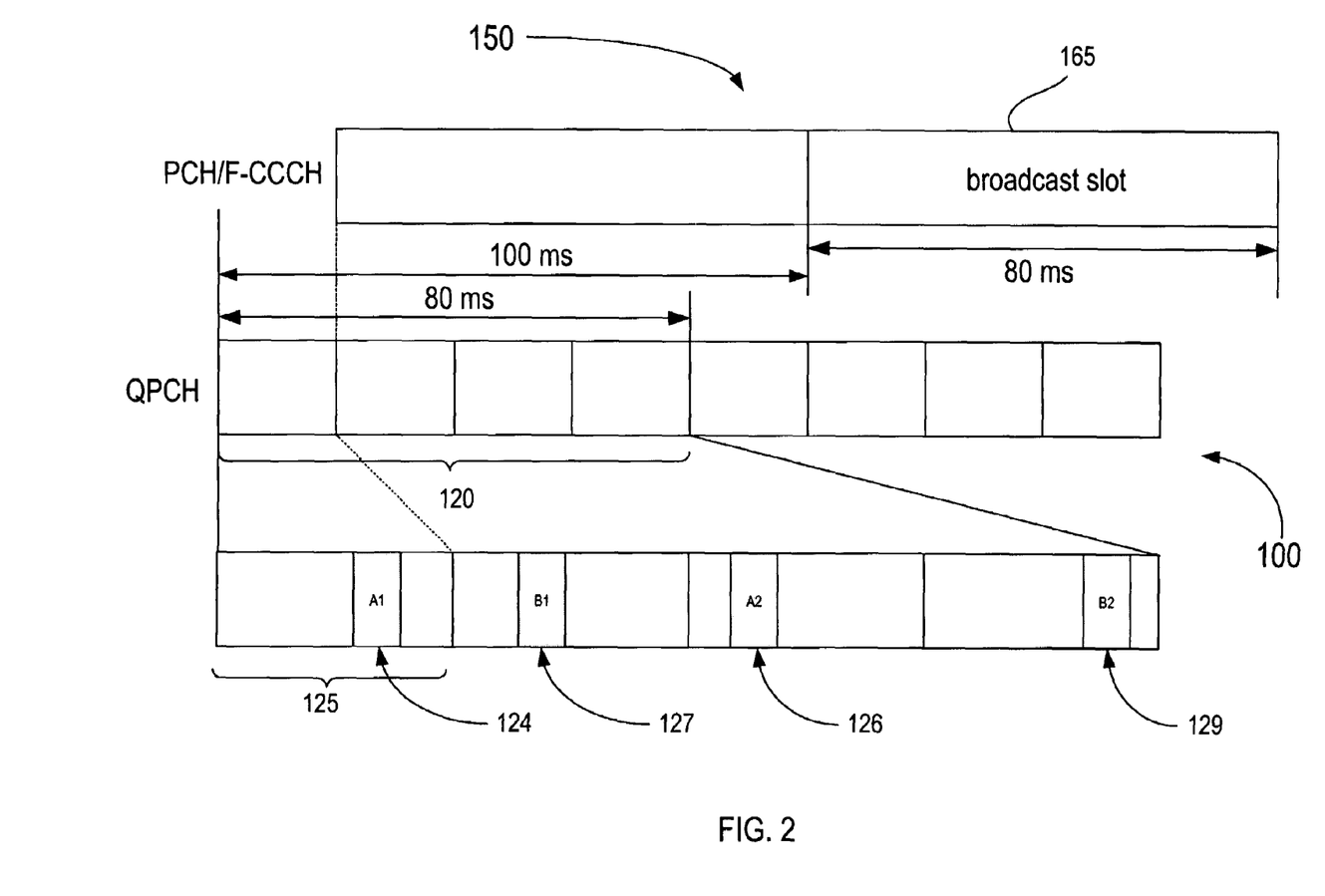
FIG. 2 is a diagram illustrating a slot structure of a quick paging channel in accordance with another exemplary embodiment of the invention.

FIG. 2 is a diagram illustrating a slot structure of a quick paging channel in accordance with another exemplary embodiment of the invention. FIG. 2 is provided to illustrate a QPCH that has BSPM indicator positions for specified BCMC groups, rather than BSPM indicator positions for all BCMC groups in a sector or cell. FIG. 2 is similar to FIG. 1, thus only the differences are discussed.

In FIG. 2, the mobile station may employ a hashing procedure on the QPCH 100, in which signaling information such as BCMCS flow ID is used to "hash" onto two indicator bit positions on the QPCH 100. The QPCH slot 120 of QPCH 100 is offset 100 ms from the broadcast slot 165 of the PCH/F-CCCH 150. The BSPM indicator bits may be set in existing indicator bit positions in the QPCH 100, in place of current reserve bit positions in the QPCH 100, or in bit positions to be newly defined for the QPCH 100.

Unlike the exemplary embodiment in FIG. 1, the QPCH 100 of FIG. 2 has BSPM indicators A1 and A2 present in the first and third quarter-slots 125, but in different locations within each quarter-slot 125, as shown generally by arrows 124 and 126. Similarly, the QPCH 100 of FIG. 2 has BSPM indicators B1 and B2 present in the second and fourth quarter-slots 125, but in different locations within each quarter-slot 125, as shown generally by arrows 127 and 129. These BSPM indicators, as they depend on a flow parameter (BCMCS flow ID), thus are flow-specific indicators, unlike the embodiment of FIG. 1.

FIG. 2 may be referred to for the following example. Consider a BCMC flow "A" corresponding to HBO and BCMC flow "B" corresponding to CNN. BSPM indicator positions 124 and 126 (A1, A2) correspond to HBO, and positions 127 and 129 (B1, B2) correspond to CNN. The BSPM indicator bits in these positions are carried on the QPCH slot 120 that precedes the broadcast slot 165. In this embodiment, since the BSPM indicators are flow specific, a mobile station (user) interested in CNN only monitors (B1, B2), and a user interested in both BCMCS contents (HBO, CNN) will monitor slot 120 for both pairs of indicators, (A1, A2) and (B1, B2). Although, here the HBO and CNN indicators here are shown in different quarter slot pairs, this need not be the case. For example, individual mobile stations may be required to monitor only one quarter slot pair within the slot in order to minimize complexity. In such a case, the indicators for HBO and CNN may need to be duplicated across quarter slot pairs.

Thus, on the user side, to receive the signaling information, a user in a BCMC group decodes the QPCH 100 to read the BSPM indicators mapped to enable a unique flow identification for a given broadcast-multicast service content flow subscribed to by one or more users of the BCMC group. This is done so the user can determine whether to monitor the PCH/F-CCCH 150 for the signaling information (BSPM), as described in the previous embodiment.

In other words, a user (or more than one user) in a BCMC group should monitor (and decode) QPCH slot 120 for BSPM indicators corresponding to specified broadcast-multicast service content flows subscribed to by the user, i.e., the BSPM indicator corresponding to the BCMC flow ID. The user then will monitor the broadcast slot 165 that follows the QPCH slot 120 for a BSPM transmission, if the decoding of the QPCH slot 120 reveals that the two BSPM indicator bits are enabled ('ON') for at least one of the subscribed to broadcast-multicast service content flows. Otherwise, a BSPM indicator is considered not enabled ('OFF'), so the user skips monitoring of the broadcast slot 165 for the BSPM.

The above embodiment may ensure that a mobile station will not decode the BSPM if the BSPM does not contain signaling information pertaining to any BCMC flow the mobile station is interested in, as evidenced by the BCMC flow ID to BSPM indicator hashing. Accordingly, the above signaling method may further conserve mobile battery life.

Figure 3:
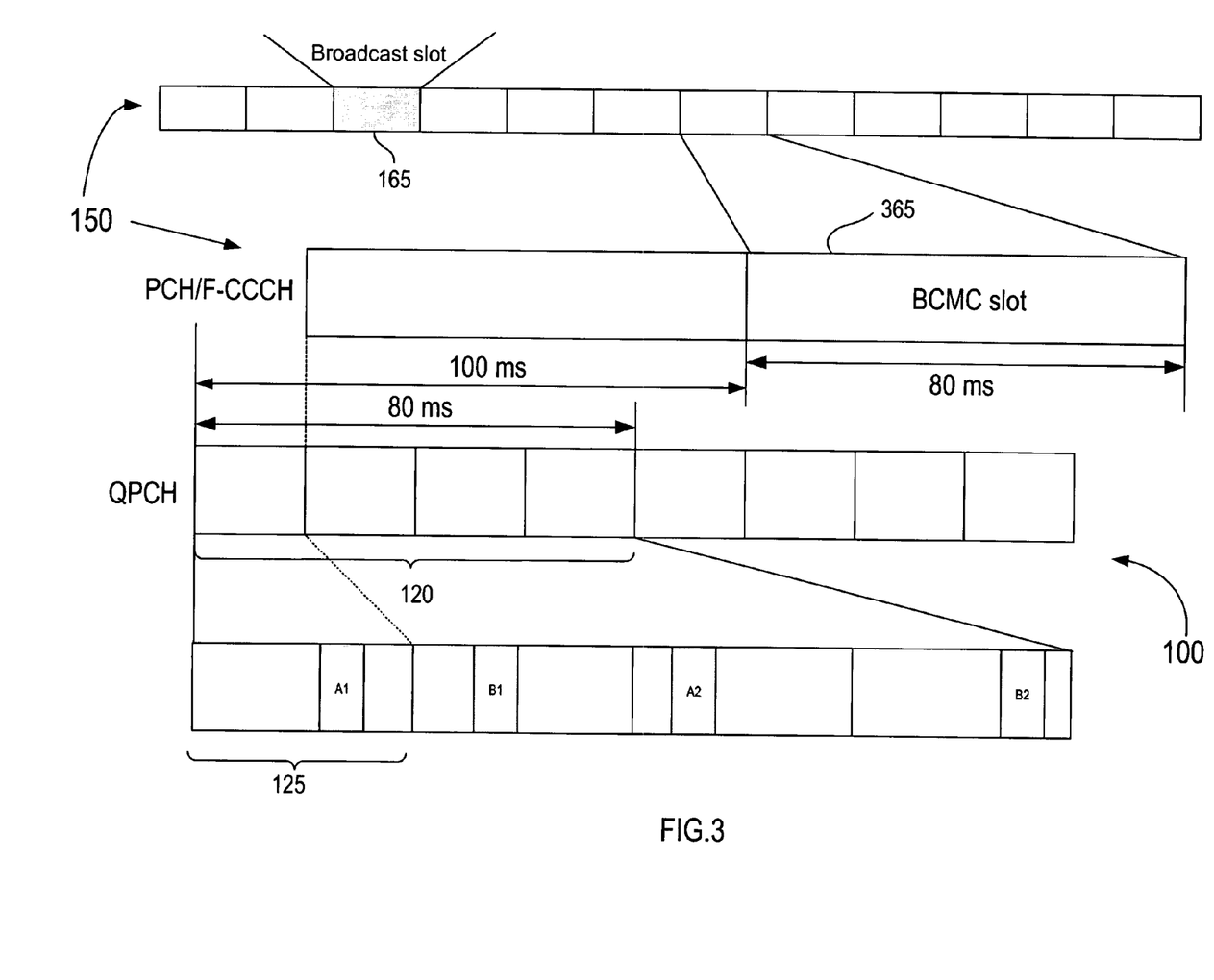
FIG. 3 is a diagram illustrating a slot structure of a quick paging channel and a BCMC slot of a paging channel or control channel in accordance with another exemplary embodiment of the invention.

FIG. 3 is a diagram illustrating a slot structure of a quick paging channel and a BCMC slot of a paging channel or control channel in accordance with another exemplary embodiment of the invention. Another exemplary embodiment is directed to a method of signaling information to a group of users, in which the PCH/F-CCCH to be transmitted to a BCMC group includes a paging slot. The paging slot, referred to as a 'BCMC slot' contains signaling information for a broadcast-multicast service subscribed to by one or more users of the group. The definition of this BCMC slot is similar to the broadcast slot that is specified on the PCH/F-CCCH.

Referring now to FIG. 3, only differences from FIGS. 1 and 2 are described for reasons of brevity. FIG. 3 shows that a BCMC slot may be used in conjunction with the assigning of BSPM indicators as described in the exemplary embodiments of FIGS. 1 and/or 2. BSPMs are transmitted on a specific BCMC slot 365 of the PCH/F-CCCH 150. The BCMC slot 365 may be the first slot of a BCMC paging cycle. The BCMC paging cycle on the PCH/F-CCCH 150 may have a duration satisfying the relation B+N, where $B=2^i*16$, where i is a configuration parameter that is bounded by $i_1$ and $i_2$, ($i_1 \leq i \leq i_2$). The parameter i may thus be a positive or negative integer. The parameter i can assume negative values, thereby providing shorter paging cycles for time critical applications. The constant N may be any positive integer (N=0, 1, ... N−1), so long as the BCMC paging cycle differs from the broadcast paging cycle. Different cycles for BSPM and broadcast paging minimizes the rate of collisions between the two. In addition, the impact on paging for unicast services may be more efficiently distributed across unicast mobiles. As discussed above, the parameter i could take on negative values, to allow for "negative BCMC paging cycles". Accordingly, BCMC paging cycles smaller than current broadcast paging cycles in the standard are possible with the relation above.

Somewhat similar to FIGS. 1 and 2, the BSPM indicators (as previously described) are carried in the QPCH slot 120 that is offset by 100 ms from the BCMC slot 365. The procedures for a BCMC-capable user that support QPCHs to receive signaling information are similar to that described above with respect to FIGS. 1 and 2, thus is not repeated in detail. For example, if the BSPM indicators are not flow-specific, and both BSPM indicators are enabled ('ON'), then the mobile station monitors the BCMC slot 365 following the QPCH slot 120 for a BSPM. BCMC-capable mobiles not supporting QPCH 100 will monitor each BCMC slot 365 on PCH/F-CCCH 150 for BSPMs.

Another exemplary embodiment is directed to a method of signaling information to the group, in which a single channel is used to transmit signaling information and BCMCS content. For example, BSPM transmission may be allowed on the F-BSCH, so that signaling data is transmitted together with broadcast-multicast service content on a single traffic channel to users of the BCMC group. For example, BSPM transmission on the F-BSCH may be allowed by the network reserving a specified field, such as SR_id 000, to indicate that a corresponding packet data unit (PDU) transmission is actually a BSPM. Accordingly, this exemplary embodiment may be suitable for transmission of BSPMs to mobile stations monitoring a BCMC flow but not any common channels (F-CCCHs/BCCHs) to provide what may be a spectrally efficient method of transmitting large BSPMs to such mobile stations.

Another exemplary embodiment is directed to a method of signaling information to the group, in which one part of the signaling information is transmitted on a first channel, and another part of signaling information is transmitted on a second channel, together with broadcast-multicast service content, to one or more users of the group. The first channel may be the QPCH and the second channel may be the F-BSCH, for example.

For example, only part of the BSPM data needs to be transmitted for the BCMC group to determine whether or not to monitor for a BSPM. This part data could include broadcast-multicast service content identifier (BCMC flow ID) and/or logical to physical channel mapping data (LMP) may be transmitted on the QPCH 100, or alternatively on the PCH/F-CCCH 150. The remaining BSPM data could be transmitted on a traffic channel with the BCMCS content, such as on the F-BSCH.

The exemplary embodiments of the present invention may offer several advantages. Paging may be used to indicate BSPM transmission by assigning BSPM indicators for BCMCS on the QPCH. Optionally, BCMC paging slots may be defined on the PCH and F-CCCH. An F-CCCH may be optionally used for BSPM transmission, in addition to use of the PCH. This may enable higher data rates up to 38.4 kbps, not previously possible on the F-CCCH. In addition, BSPM transmission in accordance with the exemplary embodiments may demonstrate improved spectral efficiency and may be suitable for transmitting BSPMs in a timely and efficient manner.

Moreover, BSPM transmission using traffic channels such as the F-BSCH, in addition to common control channels, may provide additional availability and options to the network operator. Further, the signaling methods are designed so as to minimally impact battery life of mobile stations that do not support BCMCS, while efficiently using forward link resources for transmission of BSPMs. Accordingly, "time-critical" BSPMs may be transmitted to users in a timely manner, and the aforementioned methods may allow BSPMs to be transmitted to users monitoring a BCMC flow, but not monitoring any common channel.

Further, the exemplary embodiments of the present invention may allow BSPM updates to be directed to specific BCMC groups that are intended recipients of the updates, without requiring BSPM messages to be frequently repeated in their entirety. If periodic transmission of BSPM in its entirety (similar to the current method of BSPM transmission and/or periodic broadcast paging) is enabled, perhaps with a BCMC-specific sequence indicator akin to CONFIG_MSG_SEQ to conserve the battery life of non-BCMC capable mobile stations, then the methods described herein could be employed to provide time critical BSPM updates in a spectrally efficient and battery life conserving manner. The updates may include merely differential changes (e.g. new BCMC flow ID, neighbor list change) in the BSPM message, and not the entire BSPM.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A method of signaling information to a broadcast-multicast group of users, comprising:
   assigning a plurality of indicator bits of a sequence of indicator bits which are distributed at bit positions in each quarter slot of an entire slot of a quick paging channel to indicate a transmission of signaling information related to broadcast-multicast service that is related to the group; and
   transmitting the sequence to the group and the signaling information related to the group.

2. The method of claim 1, wherein the sequence is transmitted on the quick paging channel and the broadcast-multicast service related signaling information is transmitted on a second channel.

3. The method of claim 2, wherein
   the assigning step includes assigning one or more-indicator bits to specified quarter-slots of the quick paging channel.

4. The method of claim 1, wherein
   the indicator bits are at least one Broadcast Service Parameters Message (BSPM) indicator informing at least one group of a BSPM transmission, and
   the BSPM includes signaling information intended for one or more BCMC groups.

5. The method of claim 2, wherein the assigning step includes assigning multiple indicator bits for broadcast-multicast service content flows on a slot of the quick paging channel, the slot being 100 ms offset from a specified slot on the second channel.

6. The method of claim 5, wherein
   the specified slot is a broadcast slot of the second channel.

7. The method of claim 5, wherein the specified slot is a given broadcast-multicast slot of the second channel.

* * * * *